Patented Feb. 18, 1936

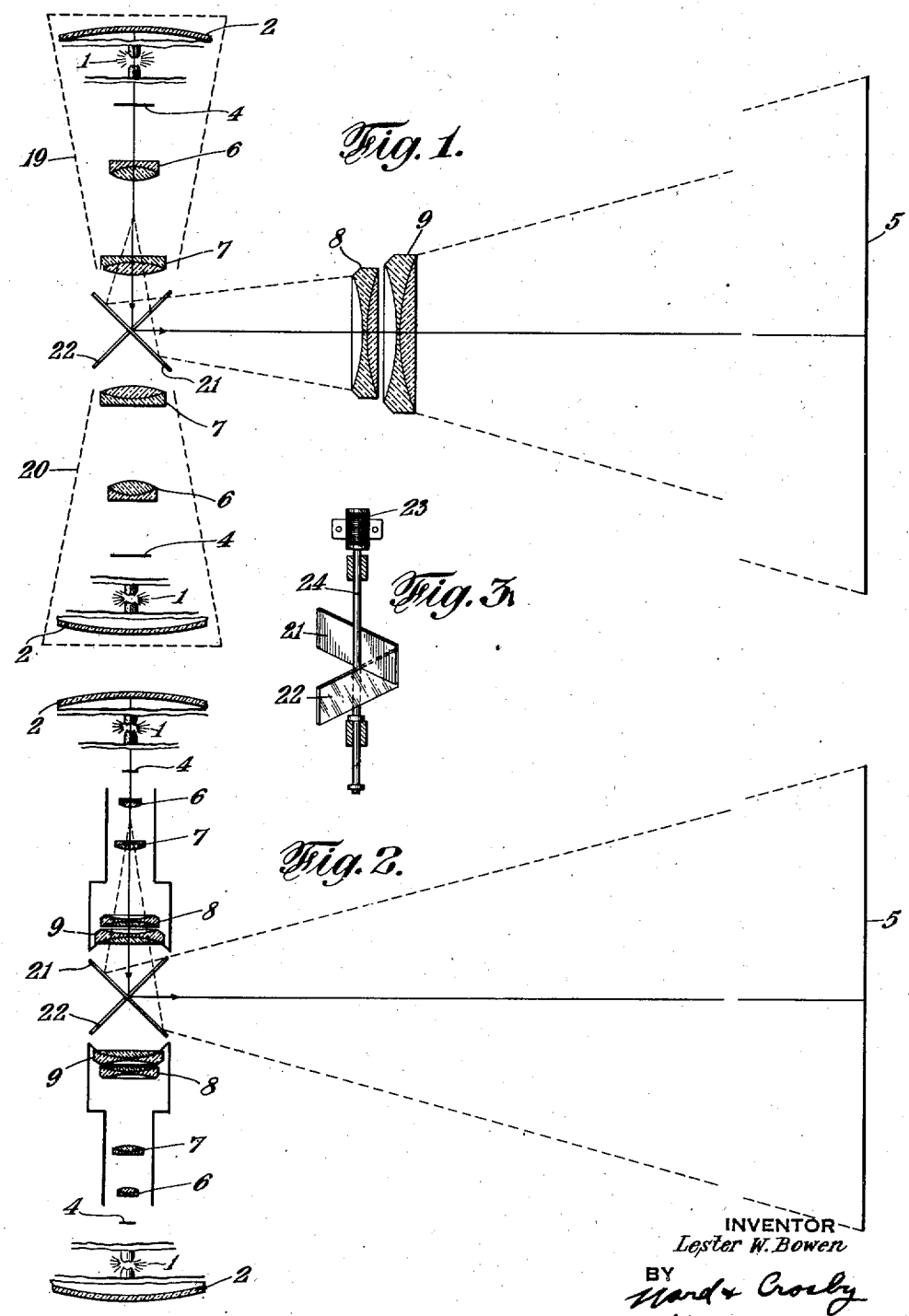

2,031,361

UNITED STATES PATENT OFFICE 2,031,361

PROJECTION APPARATUS

Lester W. Bowen, New York, N. Y., assignor to Trans-Lux Daylight Picture Screen Corporation, New York, N. Y., a corporation of Delaware Application November 1, 1928, Serial No. 316,403
Renewed April 4, 1935

5 Claims. (Cl. 88—24)

The present invention relates to apparatus for the projection of pictures, such as motion pictures, or for the projection of any desired lighting effects. The apparatus is particularly designed for projecting pictures or lighting effects on a screen or other receiving element which constitutes the equivalent of a screen. One phase of the invention relates more particularly to an apparatus or projection system in which the pictures or lighting effects are projected on to a screen which is relatively close to the projecting apparatus.

The examples of the apparatus hereinafter described are particularly designed for the projection of motion pictures or lighting effects on to screens such as used in motion picture theatres, the apparatus being disposed relatively close to the rear of the screen, instead of being disposed at a relatively great distance in front of the screen, as is the usual practice. The apparatus is also adaptable for other purposes, such for example as the display of smaller motion pictures or lighting effects as utilized in the display of advertising material in store windows and the like.

Various further specific objects, features and advantages will more clearly appear from the detailed description given below taken in connection with the accompanying drawing which forms a part of this specification.

The accompanying drawing is a diagrammatic view illustrating projection apparatus or systems embodying the invention. In the drawing, Figure 1 illustrates one arrangement for making use of alternate projectors without displacing, or creating distortion of, the picture on the screen. Fig. 2 illustrates another arrangement for making use of alternate projectors without displacing, or creating distortion of, the picture on the screen. Fig. 3 shows a detail which will be more clearly described hereinafter.

As herein illustrated, the invention of this application relates to arrangements for obtaining continuous projection with a positive-negative wide-angle lens combination of the character illustrated, for example, in U. S. Letters Patent No. 1,863,099.

In the presentation of motion pictures, at least two projectors are required, so that while a reel of film is being shown with one machine, the following reel can be prepared and set up on the other machine, so that the picture can be presented continuously on the screen without interruption for changing of reels. When the projectors are located at the front of the theatre a long distance from the screen, the projected light passing from the respective projectors to the screen is so nearly at right angles to the screen that no difficulty in obtaining a proper picture is encountered. In rear screen projection, however, where the projection distance is very short, the employment of two projectors necessarily gives rise to a considerable difference in the direction of the light rays in at least one of the projectors out of a true right angle relation with the screen. In the operation of two projectors, a space of about four feet between projectors is required in order to give the projectionist the necessary room for operation, changing of film, etc. It will be seen that a spacing of four feet between projectors for short projection distances of the order of from ten to twenty or twenty-five feet gives rise to a considerable variation of the projected light from its proper theoretical relation to the screen. The result is a very noticeable distortion in the picture, if the image from both projectors is kept within substantially the same area.

This difficulty is overcome in the apparatus of this invention by employing two projectors, indicated at 19 and 20 in Fig. 1, preferably placed with their optical axes in a generally parallel relationship to the surface of the picture receiving screen 5 and in such relation that the projectors face each other, as indicated on the drawing. In one arrangement as shown in Fig. 1, the projectors facing each other each have an optical system consisting of only the positive elements 6 and 7. The two positive systems have the same optical axis. As shown in Fig. 1, each projector may comprise a suitable light source 1 and a reflector 2 whereby a projecting light beam is passed through the film 4.

Intermediate the two end-to-end projectors is located a light intercepting and redirecting element, here shown as two reflectors 21 and 22 positioned in vertical planes one immediately above the other and crossing each other at right angles. This right-angled reflector element is movable along its vertical axis so that either reflector 21 or reflector 22 may be brought into line with the optical axis of the projectors as desired, the upper reflector 21 being here shown in operative position. Thus, a picture may be projected to the screen from either projector by merely shifting the reflector element along its vertical axis to bring the desired one of the reflectors in line with the optical axis. Two right-angled prisms arranged in the same way as the reflectors 21 and 22 will produce a similar result.

Fig. 3 shows a device for rapidly shifting the two reflectors 21 and 22 from one position to the other. This device comprises a solenoid 23 and a core 24 which is disposed vertically and carries the reflectors 21 and 22. When the solenoid 23 is energized, the core 24 will assume a position in which the reflector 22 is in its operative position. When the solenoid 23 is deenergized, the core 24 will assume a position which will put the reflector 21 in its operative position.

The negative element consisting of the combinations 8 and 9 is located in front of the reflectors 21 and 22 with its axis disposed at right angles to the axis of the positive elements of the respective projectors and also at an angle of 90 degrees with the picture receiving screen. With this arrangement, the axis of the negative element is always on the perpendicular center line of the screen, and the film pictures can be alternately projected through either of the positive elements by simply shifting the prisms or reflectors to direct light from the desired projector to the screen.

Fig. 2 shows another arrangement which permits of the alternate operation of two projectors of the type described and for the purpose described in connection with the description of Fig. 1. In this form of the invention, each projector is provided with a complete lens system and includes negative combinations or doublets 8 and 9 as well as the positive combinations or doublets 6 and 7. The reflectors 21 and 22 are disposed in the same manner as in the arrangement shown in Fig. 1 and cooperate with the two projectors in the same manner and serve the same function.

The two projectors shown in Fig. 2 are preferably disposed in such a manner with relation to each other, that the optical axis of one is disposed in a plane slightly below the optical axis of the other, and the reflectors 21 and 22 are disposed between the two projectors in such a manner that the reflector 21 cooperates with one of the projectors to reflect the pictures on to the screen and reflector 22 cooperates with the other of said projectors to reflect the pictures on to the screen. While this arrangement may bring about a slight vertical displacement of the images projected by one projector with relation to those of the other, such displacement is small and may amount to no more than the diameter of the projector lens. In this arrangement, therefore, it is not necessary to provide any apparatus for moving the reflectors 21 and 22, these reflectors remaining in their fixed position, and the two projectors may be operated successively for the projection of two successive reels of picture and the picture can therefore be presented continuously on the screen without an interruption for changing the reels.

The invention of this application, therefore, contemplates a projection system or apparatus adapted particularly for the projection of pictures or lighting effects, having such projection characteristics that clear and relatively large pictures may be presented at particularly short projection distances. This novel and useful characteristic is obtained largely by the optical or lens system which is employed, and by the proper relative arrangement of the parts of the system and the proper cooperation and combination between the parts of the optical system and the other elements of the projecting system. The invention, therefore, is defined and claimed in terms of the elements of the projecting system and the cooperative relations thereof.

The adaptability of the above described apparatus for projecting and accurately presenting large pictures at short distances makes possible the location of the projector or projectors very close to the picture receiving screen, which in turn adapts the apparatus particularly to rear screen projection which is effected by placing the projectors behind a translucent screen and projecting the picture onto the rear side of the screen which is so constituted that the picture can be viewed from the front of the screen.

In modern theater presentation it is frequently desired to illuminate large planes or to project lighting effects upon a large drop curtain made of semi-transparent material behind which, on the stage, players are seen. In a modern large theater the present apparatus is employed for such a purpose and illuminates a drop curtain of more than a hundred feet in width. In the same theater the apparatus of this invention is in regular operation at the present time in the projection of motion pictures covering a screen slightly more than 20 feet in width. This presentation is effected with the projector located only 23 feet from the picture receiving screen. The largest picture obtainable at this short projection distance by any of the ordinary types of motion picture projectors, using lenses which are at all practicable for motion picture projection, is very much smaller.

The projection of pictures referred to in the claims is understood to mean any projection or presentation of motion pictures, still pictures, lighting effects of any kind, illumination, etc., as described in the specification.

While the invention has been described in detail with respect to preferred embodiments of the same, it will be understood by those skilled in the art, after understanding the invention, that various changes and modifications may be made without departing from the spirit and scope of the invention, and it is intended, therefore, in the appended claims to cover all such changes and modifications.

What is claimed as new and desired to be secured by Letters Patent of the United States is:

1. The combination of a projector apparatus, a screen spaced from said apparatus a distance substantially the same as the longest dimension of the image on the screen, said apparatus comprising a pair of projectors facing each other and positioned with their axes in a generally parallel relationship to the plane of the screen, and reflecting means disposed between said projectors for cooperation alternatively with one or the other projector to project light on the screen, whereby said projectors may have separate motion picture films passed therethrough alternatively to form images at substantially the same area on the screen.

2. In a projection apparatus, a pair of opposed and axially aligned projectors, a diverging lens having its axis perpendicular to that of the projectors and centrally thereof, and a pair of reflectors disposed at an angle of 90° to each other on a line inclusive of the intersection of the diverging lens and projector axes, and means for positioning either of the reflector surfaces at the intersection point of said axes to project a beam from one or the other projectors through the diverging lens.

3. In a system of the character described, a pair of projectors for alternately projecting series of images on the same section of a screen, each of said projectors including a wide angle lens projection system comprising positive and negative lens assemblies, and a reflecting member associated with each wide angle lens projection system for angularly deflecting the light beam passing therethrough.

4. In a system of the character described, a pair of projectors for alternately projecting series of images on the same section of a screen, each of said projectors projecting through a wide angle lens projection system comprising positive and negative lens assemblies, and a reflecting member disposed between the positive and negative lens assemblies of the wide angle lens projection system for angularly deflecting the light beam passing therethrough.

5. In a system of the character described, a pair of opposed and axially alined projectors for projecting images on the same area of a screen, each of said projectors projecting through a wide angle lens projection system comprising positive and negative lens assemblies, a pair of reflectors disposed at an angle of 90 degrees to each other on a line inclusive of the projector axes and the center line of the screen projection area, and means for positioning either reflector surface at the intersection point of said axes to project a beam from one or the other projector to said screen projection area.

LESTER W. BOWEN.